United States Patent [19]

Renfro

[11] Patent Number: 4,548,540

[45] Date of Patent: Oct. 22, 1985

[54] SPARE TIRE SECURING APPARATUS

[76] Inventor: Don C. Renfro, 5508 Ivy Hill, Arlington, Tex. 76016

[21] Appl. No.: 652,280

[22] Filed: Sep. 20, 1984

[51] Int. Cl.$^4$ .............................................. B62D 43/04
[52] U.S. Cl. ................................ 414/463; 150/54 A; 224/42.2; 224/42.24
[58] Field of Search ............................ 224/42.2, 42.24; 296/37.2, 37.3; 150/54 A; 414/463, 466

[56] References Cited

U.S. PATENT DOCUMENTS

| | | | |
|---|---|---|---|
| 2,175,353 | 10/1939 | Jacobi | 150/54 A X |
| 2,688,372 | 9/1954 | Walker | 414/463 X |
| 3,390,864 | 7/1968 | Searcy et al. | 414/463 |
| 3,395,819 | 8/1968 | Fruetel | 224/42.23 |
| 3,539,152 | 11/1970 | Paul | 224/42.23 |
| 3,554,397 | 1/1971 | Cluff | 414/463 |
| 3,856,167 | 12/1974 | Yasue et al. | 224/42.23 |
| 3,865,264 | 2/1975 | Kuhns | 414/463 |
| 3,876,184 | 4/1975 | Eudy | 254/362 |
| 4,155,472 | 5/1979 | Dansbury | 414/466 |
| 4,329,107 | 5/1982 | Smith | 224/42.23 |
| 4,339,223 | 7/1982 | Golze | 414/462 |

Primary Examiner—Robert J. Spar
Assistant Examiner—Janice Krizek
Attorney, Agent, or Firm—Jerry W. Mills; Gregory M. Howison

[57] ABSTRACT

A tire securing apparatus includes a cylindrical enclosure (10) closed at one end for receiving a spare tire (26). The enclosure (10) is formed from a flexible material with a rigid plate (36) disposed on a recess (28) on the underside thereof. The spare tire (26) has a rim (32) which rests upon the metal plate (36) about locating lugs (38) and (40). A space (42) is formed between the side walls of the tire (26) and the lower surface thereof. This space is utilized for storage of various items. A cable (14) is attached to an eyebolt (16) and also to a winch (18). The winch (18) is attached to a motor drive package (20) on the underside of the pickup truck bed. A key switch (22) operates the motor drive package (20). Shock absorbing members (46) are disposed about the periphery of the enclosure (10) on the underside of the pickup bed truck to reduce vibrations therebetween.

1 Claim, 2 Drawing Figures

SPARE TIRE SECURING APPARATUS

TECHNICAL FIELD OF THE INVENTION

The Present invention pertains in general to spare tire holders and, more particularly, to spare tire holders for the underside of a pickup truck bed which both support and protect the tire from the elements.

BACKGROUND OF THE INVENTION

The location of the spare tires for various vehicles has long presented a problem to manufacturers. In some types of automobiles, it is relatively easy to locate the tire in the trunk whereas station wagons and like vehicles have required separate wheel wells for the spare tire. However, pickup trucks which utilize the rear portion for transporting materials and the such do not have a readily accessible area for storage of the spare tire. Therefore, automobile manufacturers have either stored the spare tire on the side of the bed or, more conventionally, underneath the rear portion of the bed.

For pickup trucks of the type having the spare tire stored underneath the bed, a number of disadvantages exist. This type of storage is usually quite inconvenient for the operator in both retrieving the tire and also replacing the tire, normally resulting in the tire being transported in the pickup bed rather than secured underneath. This is a result of the tire being secured by a threaded shaft and wing nut configuration with the threaded shaft being exposed under the truck to debris, etc. To gain access to the spare tire with a damaged shaft requires two individuals to lie on their backs to both retrieve the tire and replace it. Additionally, storage under the bed incurs a high risk of theft in that the tire is always exposed. This exposure also results in a large amount of road dirt and grime deposited on the spare tire such that retrieval thereof results in a great deal of grime being transferred to the vehicle operator's hands.

To facilitate ease of removal of spare tires, a number of approaches have been taken such as winches and the such. These are disclosed in U.S. Pat. Nos. 3,395,819; 3,856,167; 3,865,264; 3,554,397 and 3,539,152. All of these patents disclose various methods for lowering the tire from underneath the truck by an external mechanism such as a winch. However, none of these approaches prevents dirt and grime from getting on the spare tire when it is in the secured position nor do they prevent theft.

In view of the above disadvantages, there exists a need for a tire securing apparatus that both protects the spare tire and also provides some degree of security therefor.

SUMMARY OF THE INVENTION

The present invention disclosed and claimed herein comprises an apparatus for securing a spare tire under the bed of the pickup truck. The apparatus includes an enclosure formed from a hollow right circular cylinder having a height greater than the thickness of the spare tire and sealed on one end thereof. A recess is formed in the sealed end with a rigid plate attached thereto. The rigid plate is perpendicular to the axis of the cylinder and spaced such that the rim of the tire rests thereon with the sidewalls of the spare tire disposed a predetermined distance from the closed end of the enclosure. This space allows for storage of items underneath the tire. A cable is attached to an eyebolt in the rigid plate and also to a winch mounted on the bottom of the pickup truck bed. The winch retracts and extends the cable such that the enclosure can be pulled up against the underside of the pickup truck bed. The cable is detachable such that the spare tire can be easily removed from the enclosure. A key switch is also provided for selectively allowing access to the operation of the winch.

In another embodiment of the present invention, locating lugs are provided on the rigid plate for cooperating with lug holes in the rim of the spare tire to prevent rotation or movement thereof with respect to the enclosure. Shock absorbing members are mounted on the underside of the pickup truck bed to cooperate with the upper peripheral edges of the enclosure. These shock absorbing members have outwardly and downwardly tapered surfaces to provide some tolerance for the retraction of the cable. To further facilitate removal of the spare tire from the underside of the pickup truck bed, handles are provided on the lower peripheral edge of the enclosure to allow an operator to laterally move the enclosure.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
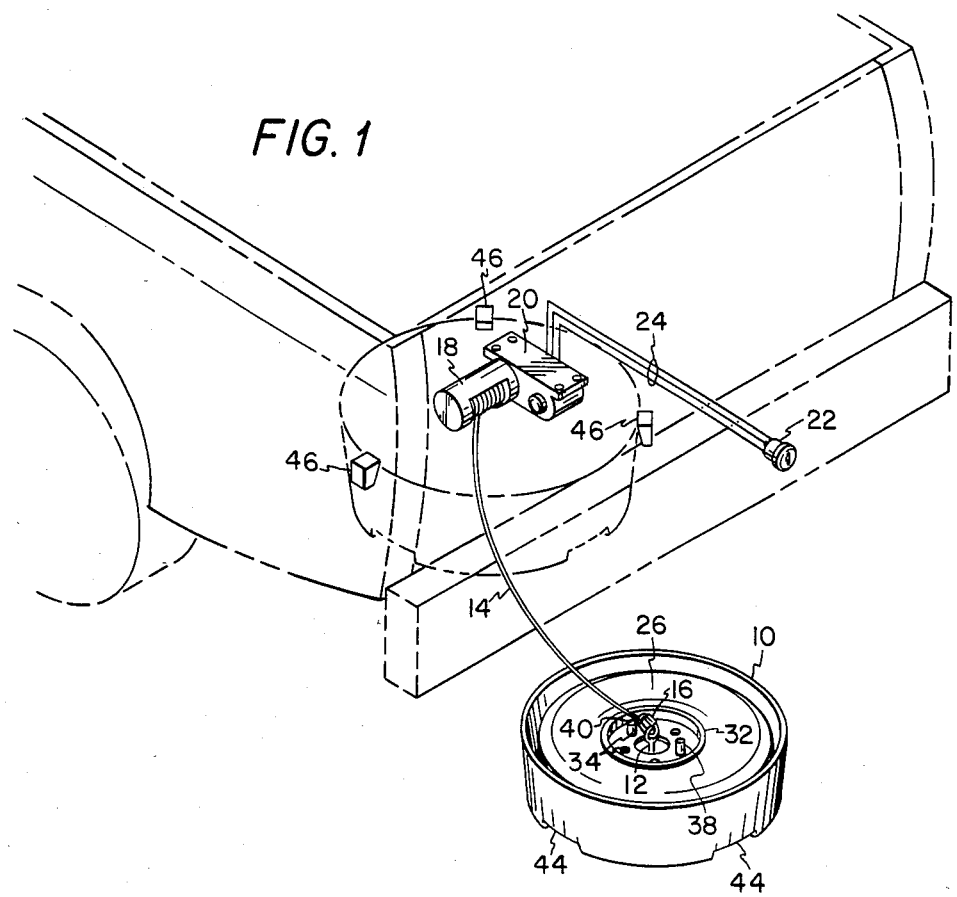
FIG. 1 illustrates a perspective view of the tire securing apparatus in accordance with the present invention with the tire shown extended away from the vehicle.

Referring now to FIG. 1, there is illustrated a perspective view of the tire securing apparatus in accordance with the present invention. The apparatus is disposed under the bed of a pickup truck, which is illustrated in phantom outline. The tire securing apparatus in accordance with the present invention is comprised of an enclosure 10 which has an eyebolt 12 attached to the center thereof. The eyebolt 12 has a cable 14 attached thereto through a quick disconnect snap ring 16. The cable 14 is wound on the other end thereof about a winch mechanism 18 for retraction thereof to raise the enclosure 10 upward and against the underside of the pickup truck.

The winch 18 is driven by a motor drive mechanism 20. The motor drive mechanism 20 can be a conventional type of mechanism for driving the winch 18 and being powered by a 12 volt source. One example of a motor of this type is that utilized in electrically operated automobile windows. These are reversible motors which have a worm gear drive mechanism. The winch 18 can be interfaced with the worm gear through a gear reduction box of conventional construction.

To operate the motor 20, a key switch 22 is mounted on the bumper of the truck and connected to the actuating contacts of the motor 20 through wires 24. The wires 24 are concealed such that access thereto is impeded, thus preventing access to the controls for the motor drive package 20 without a key. Additionally, the power connection for the motor drive mechanism 20 can be connected through the ignition switch such that activation of the ignition circuit on the vehicle is required to initiate operation of the spare tire mechanism.

Figure 2:
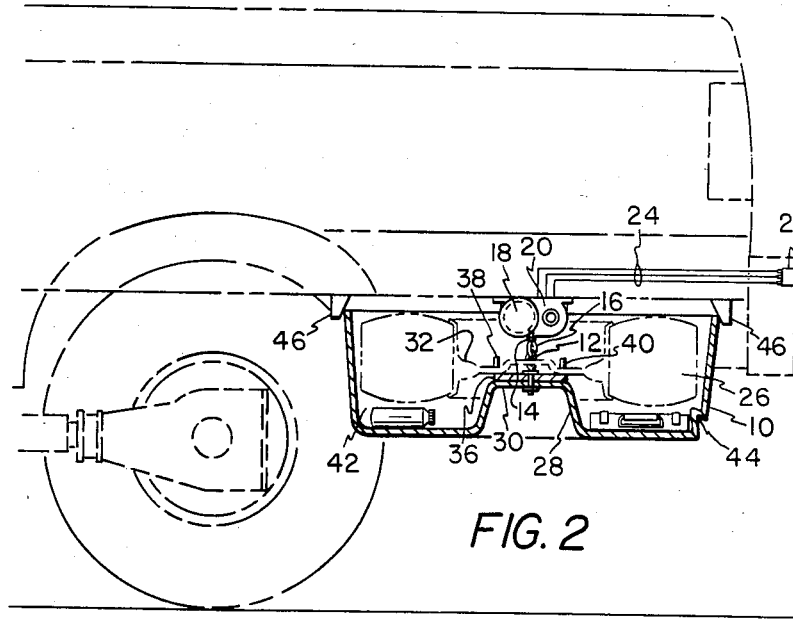
FIG. 2 illustrates a cross-sectional diagram of the tire securing apparatus shown secured to the underside of the vehicle with a tire in place.

Referring now to FIG. 2, there is illustrated a side view of the phantom line pickup truck with the tire securing apparatus fitted against the underside of the truck and shown in cross-section. Like numerals refer to like parts in the various figures. A tire 26 is illustrated inside the enclosure 10. The enclosure 10 is donut shaped with a recess 28 formed in the center thereof. The recess 28 is sealed and has a planar surface 30 as an integral part thereof. The recess 28 and the enclosure 10 are a sealed surface fabricated from materials such as fiberglass or polyvinyl chloride (PVC) material. However, such materials as aluminum or chrome plated steel can also be utilized to provide a lightweight enclosure.

The tire 26 has a rim 32 on which the tire 26 is mounted. The rim 32 has a number of mounting holes 34 for mating with appropriate lugs on the wheel. The rim 32 is operable to mount upon a reinforcing plate 36 that is adjacent the planar surface 30 on the interior of the enclosure 10. The eyebolt 12 passes through the center of the rim 32 such that the cable 14 can be attached thereto. To ensure that the rim 32 is centered on the reinforcing plate 36, locating lugs 38 and 40 are provided and protrude upward from the reinforcing plate 36 for mating with the mounting holes 34. Although only two locating lugs 38 and 40 are illustrated, it should be understood any number of locating lugs can be utilized, depending upon the number of lug holes provided for in the rim of the tire. However, different vehicles utilize different size rims with a different number of lug holes therein and, also, a different spacing therefor. Therefore, an alternate embodiment may utilize a single locating lug or adjustable locating lugs to compensate for differing rim sizes.

The enclosure 10 is dimensioned such that a space 42 is formed underneath the sidewalls of the tire 26. This space is defined by the depth of the recess 28. By providing the space 42, a valuable storage area is formed for storing such things as miscellaneous tools, tire inflating aerosols and tire changing tools. The weight of the tire 26 is carried by the upward force of the eyebolt 12 on the reinforcing plate 36. Therefore, the enclosure 10 provides both a protective function and a storage compartment for both the stored items and the tire 26.

In operation, the switch 22 is activated to place the motor drive package 20 in reverse operation to allow the winch 18 to unwind the cable 14. This allows the enclosure 10 to be lowered from the bottom of the pickup truck bed. Handles 44 are molded into the lower peripheral edges of the enclosure 10 to allow an operator to obtain a grip on the enclosure 10 as it is being lowered. This enables the operator to pull the enclosure 10 outward from under the pickup truck prior to its contact with the ground or, alternatively, sliding it along the ground after a sufficient amount of slack has been imparted to the cable 14.

After the enclosure 10 has been lowered to the ground, the cable 14 can be detached via the snap ring 16 and the tire 26 removed. Removal of the tire 26 exposes the space 42 and the contents thereof.

In reverse operation, the tire 26 is placed back on the locating lugs 38 and 40 and the cable 14 attached to the eyebolt 12 with the snap ring 16. The switch 22 is activated in the opposite direction such that the motor drive package 20 is in the forward mode to wind the cable 14 about the drum of the winch 18. This causes the enclosure 10 to be pulled upward against the underside of the pickup. When the enclosure 10 has contacted the bottom of the pickup bed, no further winding of cable 14 about the drum of the winch 18 is possible and the tire 26 is in its secured position. The key can then be removed from the key switch 22, thus securing the tire upwards against the pickup bed.

To facilitate alignment of the enclosure 10 against the bottom of the pickup bed, three beveled members 46 are mounted on the bottom of the pickup bed and positioned such that they contact the periphery of the enclosure 10 spaced at 120° apart. The surface of each of the members 46 is beveled and tapered outwardly away from the radial center of the enclosure 10 and downward from the pickup truck bed. This enables the peripheral edges of the shell 10 to contact the beveled edge and be secured thereagainst. The members 46 are fabricated from a resilient material such as rubber to both reduce vibration of the enclosure 10 and also to space the enclosure 10 slightly below the bottom of the pickup bed. Since the chassis underneath a pickup bed can be irregular, depending upon the particular model that the device is mounted upon, it is necessary to have three or more of the members 46 to prevent the enclosure 10 from pivoting about the eyebolt 12.

In summary, there has been provided a tire securing apparatus which includes a donut shaped enclosure for receiving the spare tire. The donut shaped enclosure has a reinforcing member upon which the tire rim rests with an eyebolt disposed therethrough. A cable is attached the eyebolt on one end thereof with the other end thereof attached about a winch. The winch is attached to a motor drive package mounted on the underside of a pickup bed. Activation of the motor drive package raises and lowers the donut shaped enclosure. A space is also provided between the bottom of the tire and the lower surface of the enclosure such that a storage compartment is formed.

Although the preferred embodiment has been described in detail, it should be understood that various changes, substitutions and alterations can be made therein without departing from the spirit and scope of the invention as defined by the appended claims.

What is claimed is:

1. An apparatus for securing a spare tire under the bed of a pickup truck, comprising:

a flexible enclosure formed from a hollow right circular cylinder having a height greater than the thickness of the spare tire, said cylinder sealed on one end thereof with a recess formed in said one end extending into the interior of said cylinder;

a rigid plate disposed on the surface of said recess and perpendicular to the access of said cylinder, said recess and said rigid plate for receiving the rim of the spare tire are dimensioned such that a space is formed between the side walls of the spare tire and said closed end, said space for storage;

locating lugs disposed in said rigid plate and extending upwards therefrom for cooperation with lug holes in the rim of the spare tire;

an eyebolt disposed in the rigid plate in the center thereof for extending through the center of the rim of the spare tire;

a cable;

a detachable clamp connected to one end of said cable for insertion through the eyebolt, said clamp allowing removal of the end of said cable from said eyebolt such that the spare tire can be pulled out of said enclosure over said eyebolt;

a motor drive package mounted on the bottom of the pickup bed truck;

a winch attached to said motor drive package and activated thereby, said winch having the other end of said cable attached thereto for extension and retraction thereof;

said motor drive package operating in one direction to retract said cable with said winch and in the opposite direction to extend said cable from said winch;

a secured key switch for activating said motor drive package, said key switch preventing access to the operation of said motor drive package without a corresponding key;

first, second and third shock absorbing members mounted on the underside of the pickup truck bed and disposed proximate the periphery of said enclosure when said cable is fully retracted by said winch;

said shock absorbing members having a beveled surface tapering downward and outwardly from the pickup truck bed such that the upper peripheral edge of said enclosure contacts the tapered surface to prevent contact of said enclosure with the underside of the pickup truck bed; and integral grips formed in the lower peripheral edge of said enclosure to allow an operator to grasp the lower peripheral edge to laterally move said enclosure away from the pickup truck when said cable is extended from said winch.

* * * * *